Dec. 1, 1959 H. G. THAMES 2,915,592

TELEPHONE SUB-STATION

Filed Jan. 31, 1956 3 Sheets-Sheet 1

INVENTOR
HANS GÖSTA THAMES
By Kane and Nydick
ATTORNEYS

INVENTOR
HANS GÖSTA THAMES

BY Kane and Nydick
ATTORNEYS

INVENTOR
HANS GÖSTA THAMES
BY Hane and Nydick
ATTORNEYS

United States Patent Office 2,915,592

Patented Dec. 1, 1959

2,915,592

TELEPHONE SUB-STATION

Hans Gosta Thames, Hagersten, Sweden, assignor to Telefonaktiebolaget L M Ericsson, Stockholm, Sweden, a corporation of Sweden Application January 31, 1956, Serial No. 562,541

Claims priority, application Sweden February 17, 1955

7 Claims. (Cl. 179—81)

In telephone sub-stations of automatic CB-exchanges, condensers having three different functions are usually used, the functions being as follows:

(*a*) A ringing condenser ($C_R$ in Fig. 1), the object of which is to block the direct current through the signal means B to prevent the line relay of the telephone exchange from being operated.

(*b*) A spark quenching condenser ($C_G$ in Fig. 2), the object of which is to reduce the voltage over the impulse contact in the dial D, the condenser for example being connected in series with a resistance $r_1$.

Figure 3:
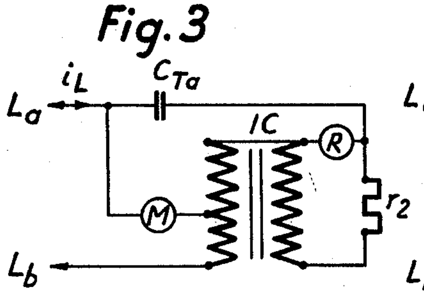
Figure 4:
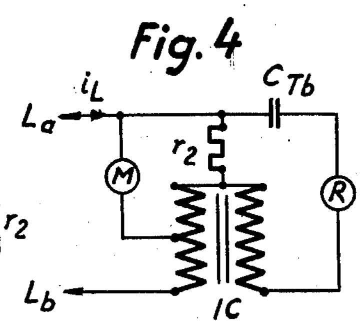

(*c*) A speech condenser ($C_{Ta}$, Fig. 3, and $C_{Tb}$, Fig. 4), the object of which is to block part of the speech circuit for direct current. In Fig. 3 is shown an embodiment in which the condenser $C_{Ta}$ is located in such a manner that the entire line current $i_L$ is forced to pass the microphone M, which is of the type free of interruption, i.e. the type, in which the electrode system and the carbon chamber are shaped so that—independent of in which position the microphone is held—no interruption of the current through the microphone occurs, said condenser $C_{Ta}$ simultaneously protecting the telephone receiver R against direct current flowing therethrough. In carbon granule microphones which are not free of interruption a connection according to Fig. 4 is for example used, the condenser $C_{Tb}$ being connected in the circuit in such a manner that direct current is prevented from passing the receiver R.

Figure 1:
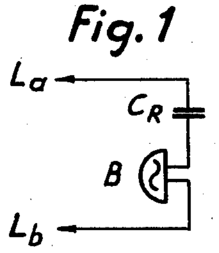
Figure 2:
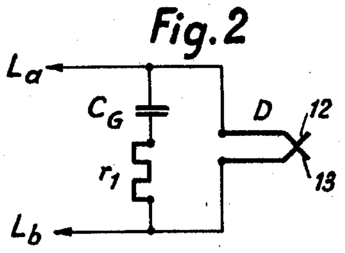
Figure 5:
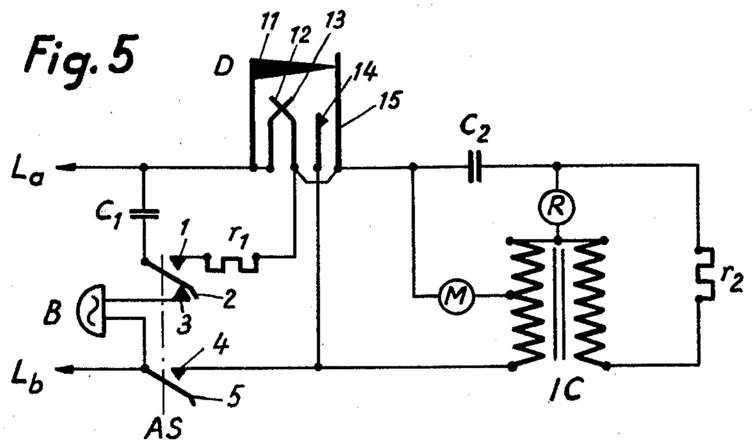
Figure 9:
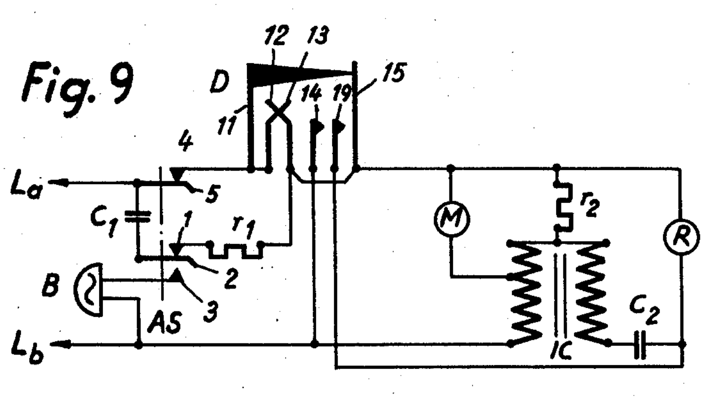

The functions of the ringing and spark-quenching condensers are usually performed by one and the same condenser by means of switching in the switch hook, which is the case in the known connections shown in Figs. 5 and 9. The circuits according to Figs. 1, 2 and 3 are comprised in Fig. 5, and the circuits according to Figs. 1, 2 and 4 are comprised in Fig. 9, $L_a$ and $L_b$ referring to the two line branches, AS to the switch hook, B to the signal means, D to the dial, M to the microphone, R to the receiver, IC to the speech transformer, $r_1$ to the spark-quenching resistance, $C_1$ to the combined ringing and spark-quenching condenser and $C_2$ to the speech condenser and $r_2$ to a balance resistance. In a circuit as disclosed in Fig. 5 the balance resistance $r_2$ may possibly be included in the right winding of the speech transformer IC. When the telephone instrument is connected in ringing condition (shown in Fig. 5), the condenser $C_1$ is via the contact springs 2 and 3 in the switch hook AS connected in series with the signal means B between the two line branches $L_a$ and $L_b$, and in speech condition when the contacts 1, 2 of the switch hook AS are closed, the condenser $C_1$ is connected via the contact springs 1 and 2 in the switch hook in series with the spark-quenching resistance $r_1$ via the impulse springs 12 and 13 in the dial D.

Figure 6:
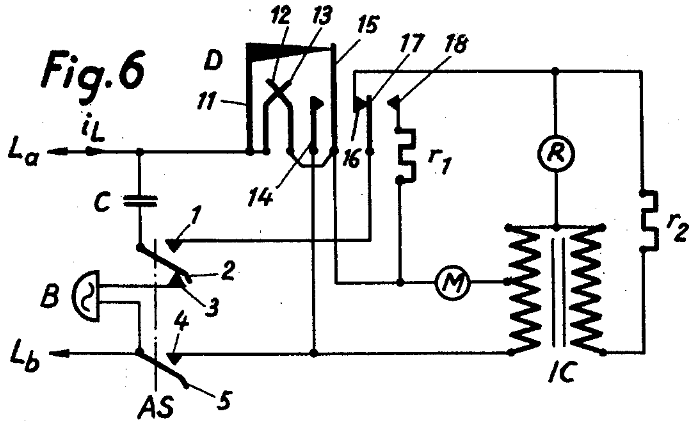
Figure 7:
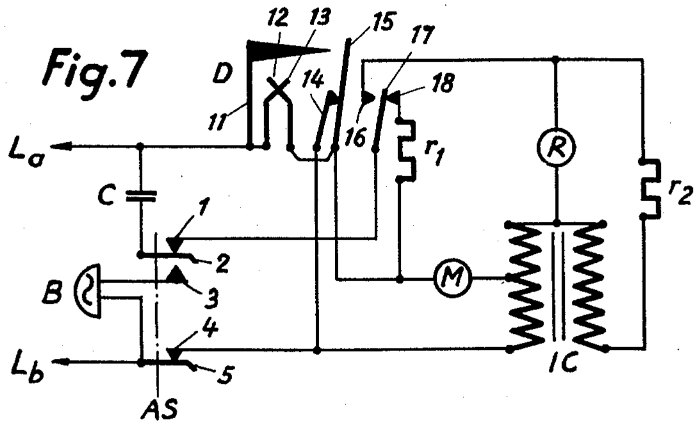
Figure 10:
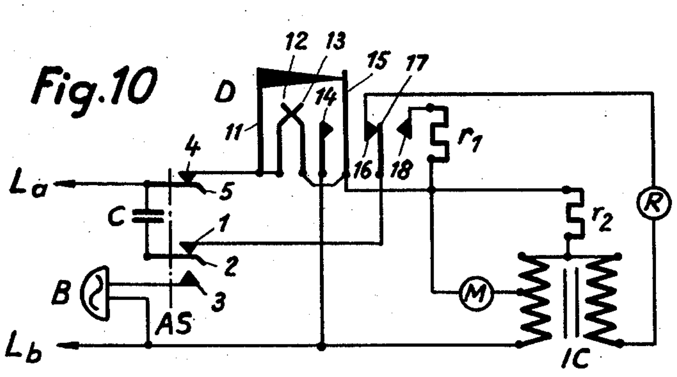

The object of the present invention is to use one and the same condenser both as spark-quenching condenser and speech condenser and, in case the instrument is provided with a signal means, to use the condenser as ringing condenser as well, by providing the dial D with a further change-over contact (16, 17, 18) besides the contacts (14 and 15 and 11 and 15, respectively) used for short-circuiting the instrument-impedance and the impulse contacts. Figs. 6, 7 and 10 show circuits according to the invention, the different elements of Figs. 6 and 7 being connected according to Fig. 3 and those of Fig. 10 according to Fig. 4. A single condenser C thereby performs the three functions of ringing, spark-quenching and speech condenser.

The circuit according to Fig. 6 shows the instrument in ringing condition, the condenser C thereby being, by means of one of its electrodes, connected to the line branch $L_a$ and by means of its other electrode, via the contact springs 2 and 3 of the switch hook AS, connected in series with the signal means B, which latter is connected to the other line branch $L_b$.

When the instrument is switched to speech-condition by the handset telephone being lifted, the switch hook AS is moved upwards, the contact between the springs 1, 2 and 4, 5 thereby being closed. The condenser C thereby forces the line D.C. current $i_L$ in the line branch $L_a$ to pass the impulse springs 12—13 and the short-circuiting springs 11 and 15 in the dial D connected with said first-mentioned springs, the microphone M part of the speech transformer IC, the contacts 4—5 in the switch hook AS, and to flow in the line branch $L_b$. The audio-frequency speech current is free to flow through the condenser C via the springs 1—2 in the switch hook AS, the contacts 17—16 in the dial D, the receiver R, the speech transformer IC and the contacts 4—5 in the switch hook AS.

When impulses are sent over the line $L_a$, $L_b$, the impulse springs 12—13 in the dial thereby being either opened or closed, dependent on the position of the impulse cam, the springs 14 and 17 are bent to the right, the contact between the springs 14 and 15 and 17, and 18, respectively, thereby being closed, simultaneously with the spring 15 being bent to the right so that the contact between said spring and the spring 11 is broken. The position of the contact springs at that moment is shown in Fig. 7. The spark-quenching circuit, consisting of the condenser C and the spark-quenching resistance $r_1$ connected in series therewith over the contact springs 2, 1 and 17, 18, is thereby connected to the impulse springs 12, 13 in the dial.

Figure 8:
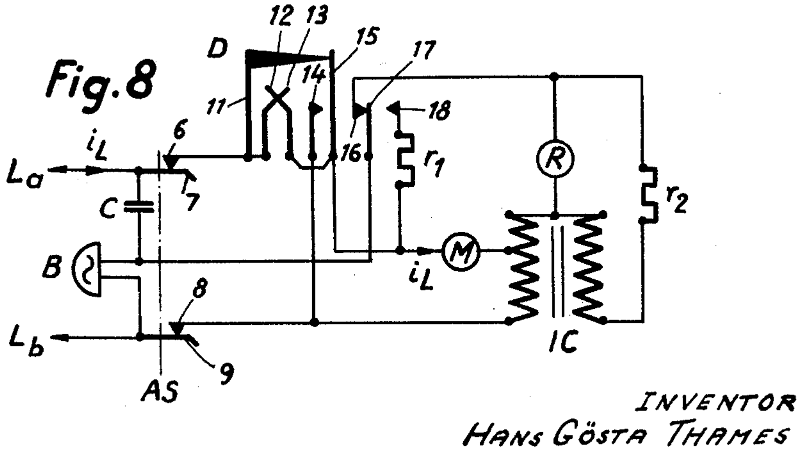

Fig. 8 shows a variation of the instrument connection according to Figs. 6–7, the signal means B being, in series with the condenser C, permanently connected between the line branches $L_a$ and $L_b$. In this case also the whole of the feeding current $i_L$ passes the microphone M but thereafter it branches out in the speech transformer IC, one part passing the receiver R and further over the springs 16—17 in the dial D and through the signal means B, being in series with the receiver R, whereas most of the current $i_L$ passes through the transformer IC and over the contacts 8, 9 and onto the line. The relation between the resistance of the speech transformer IC and that of the receiver R+ that of the signal means B is such, that such a small part ($\frac{1}{50}$–$\frac{1}{100}$) of the feeding current $i_L$ passes the receiver R that it is negligible as regards the receiver R.

Fig. 10 shows a diagram of an instrument of the same type as the known one, shown in Fig. 9. According to the invention the circuit is however connected in such a manner that the condenser $C_2$ in Fig. 9 can be left out since its function is performed by the condenser C. The ringing circuit is closed over $L_a$—C contacts 2—3 in AS—B—$L_b$. The receiver circuit is closed over R—IC (the right part)—$r_2$—contacts 13—12 in parallel with contacts 15 and 11 in D, contacts 4—5 in AS—C—contacts 2—1 in AS—contacts 17—16 in D—R. The spark-quenching circuit is closed over C—the springs 2—1 in the switch hook AS—the springs 17—18 in D—$r_1$—the impulse springs 13—12 in D—the springs 4—5 in AS—C.

Figure 11:
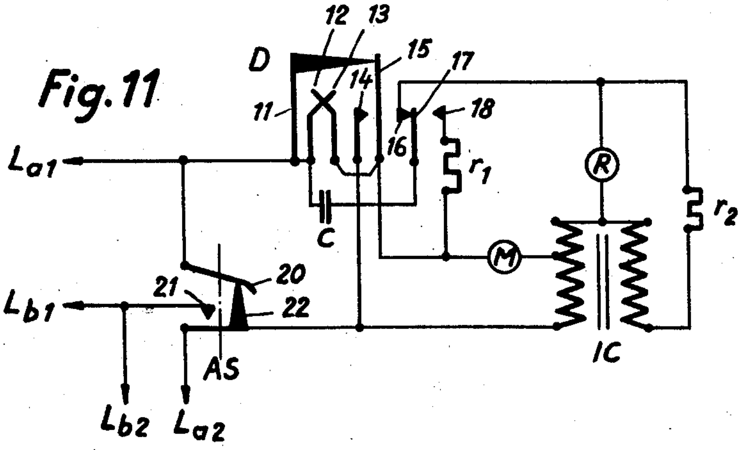

Fig. 11 shows the circuit of an instrument which does not include signal means (which is i.a. the case in so called auxiliary instruments), and in the drawing, which shows the circuit diagram of the auxiliary instrument, $L_{a1}$ and $L_{b1}$ refer to the line to the exchange, and $L_{a2}$ and $L_{b2}$ refer to the line to a main instrument, which is not shown and may be built in any suitable, known manner. AS refers to the switch hook of the auxiliary instrument, which on the drawing is shown replaced. The spring 20 is pre-tensioned upwards and so is the spring 22. A ringing signal incoming from the exchange over the branches $L_{a1}$, $L_{b1}$, passes the closed contact springs 20, 22 via the line $L_{b2}$, $L_{a2}$ to the main instrument. When the auxiliary instrument is to be used and its handset is lifted, the contact springs 20 and 22 are moved upwards until 22 makes contact with 21 when the movement of 22 upwards is checked. The spring 20 continues its upwards movement somewhat until the contact is broken between it and the spring 22. The auxiliary instrument is then connected to the exchange over the line $L_{a1}$ and over $L_{b1}$ via contacts 21, 22. The condenser C is then connected over the contact 16—18 alternatively to the receiver R or to the spark-quenching resistance $r_1$ in a manner analogous to what has been described in connection with Fig. 6.

I claim:

1. A telephone sub-station comprising, in combination a dialling means, a pulse contact having two normally closed contact elements, a make contact and a break contact, said make contact being closed and said break contact being opened by and during actuation of said dialling means, two incoming line branches, transformer means having a first, a second and a third winding connected in series one with another, a resistance means, a single capacitance means, a circuit means connected across said line branches and connecting in series said three transformer windings, said break contact and said capacitance means, a receiver and a microphone connected to said transformer means, said circuit means being normally closed over said break contact but opened at said contact upon actuation of said dialling means, and a spark-quenching circuit means connected across the contact elements of said pulse contact and connecting in series said capacitance means, said resistance means and said make contact, said spark-quenching circuit means being normally open at said make contact but closed over said make contact upon actuation of said dialling means.

2. A substation according to claim 1, wherein said receiver is connected in parallel with the third winding of said transformer means.

3. A substation according to claim 1, wherein said receiver is connected in series with the three windings of said transformer means.

4. A substation according to claim 1, wherein said microphone and a circuit including in series said second and said third winding, said break contact and said capacitance means are connected in parallel.

5. A substation according to claim 1, wherein said make contact and said break contact are combined to constitute a switch-over contact means having a movable contact and two stationary contacts, said movable contact being connected to one terminal of said capacitance means, and one of said stationary contacts being connected to one terminal of said resistance means and the other stationary contact being connected to said receiver.

6. A substation according to claim 1 and further comprising a signalling circuit including a signal means and said capacitance means connected in series, said signalling circuit being connected across said both line branches in the signalling condition of the substation.

7. A substation according to claim 6, wherein said signalling circuit further includes a switch hook.

References Cited in the file of this patent

UNITED STATES PATENTS

| | | |
|---|---|---|
| 1,907,660 | Pfeiffer | May 9, 1933 |
| 1,993,780 | Gooderham et al. | Mar. 12, 1935 |
| 2,214,259 | Pye | Sept. 10, 1940 |
| 2,341,711 | Given | Feb. 15, 1944 |
| 2,394,275 | Tschumi | Feb. 5, 1946 |
| 2,643,300 | De Stadelhofen et al. | June 23, 1953 |